United States Patent
Pfau et al.

[11] 3,832,510
[45] Aug. 27, 1974

[54] PULSE GENERATOR FOR EDM MACHINE

[75] Inventors: Jean Pfau; Georges-Andre Marendaz; Heinz Rhyner, all of Geneva, Switzerland

[73] Assignee: Ateliers des Charmilles S.A., Geneva, Switzerland

[22] Filed: June 8, 1973

[21] Appl. No.: 368,220

[30] Foreign Application Priority Data
June 16, 1972 Switzerland.......................... 9044/72

[52] U.S. Cl. ............................... 219/69 C, 219/69 P
[51] Int. Cl. ............................................... B23k 9/16
[58] Field of Search ............... 219/69 C, 69 V, 69 P

[56] References Cited
UNITED STATES PATENTS
| | | | |
|---|---|---|---|
| 3,485,990 | 12/1969 | Sennowitz | 219/69 C |
| 3,588,431 | 6/1971 | Pekelharing | 219/69 C |

*Primary Examiner*—J. V. Truhe
*Assistant Examiner*—Hugh D. Jaeger
*Attorney, Agent, or Firm*—Hauke, Gifford, Patalidis & Dumont

[57] ABSTRACT

The present invention is a pulse generator for electro-erosion machining which is capable of providing controlled voltage pulses between an electrode tool and an electrode workpiece, such pulses having a sharp vertical leading edge throughout a wide frequency range and providing an optimum energy efficiency. The pulse generator of the invention, which is connected across the electrode tool-workpiece machining gap, comprises essentially a DC power supply, an electromagnetic energy storage element and a first circuit make and break element, such as a switch, connected between one of the DC power supply terminals and one of the terminals of the electromagnetic storage device. A first unidirectional element is connected between the first terminal of the electromagnetic storage element and the other terminal of the power supply, so as to provide a current path through a first auxiliary circuit when the first circuit make and break element is open. The circuit comprises a second unidirectional element connected between one of the power supply terminals and one of the electrodes, tool or workpiece, and a second circuit make and break element or switch connected so as to provide a current path, when the second circuit make and break element is open, through a second auxiliary circuit, or through a third auxiliary circuit when both circuit make and break elements are open. The first circuit make and break element is controlled in such manner as to cause the current flowing across the energy storage element to be maintained at a predetermined value and the second circuit make and break element is controlled so as to control in turn the duration of each voltage or current pulse and/or the time interval during two consecutive voltage pulses.

24 Claims, 13 Drawing Figures

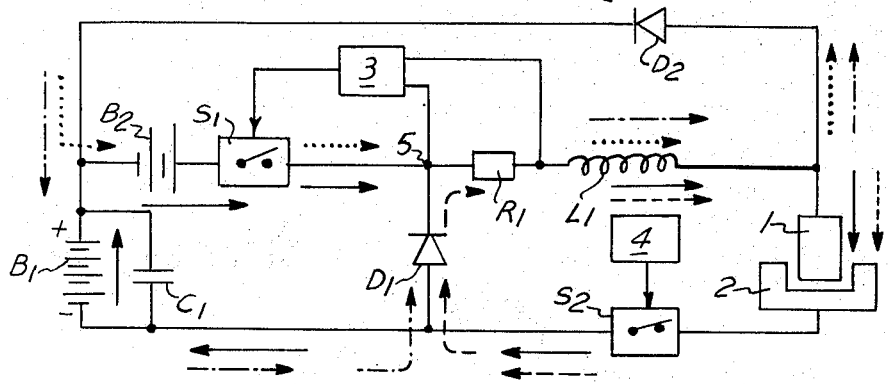
FIG. 1
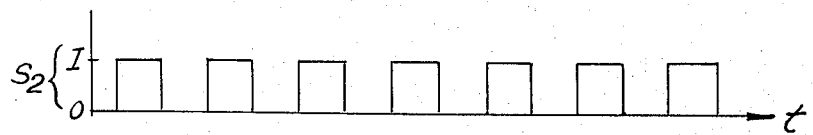
FIG. 2a
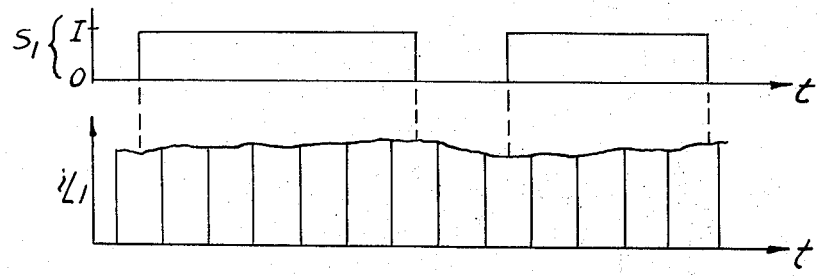
FIG. 2b
FIG. 2c
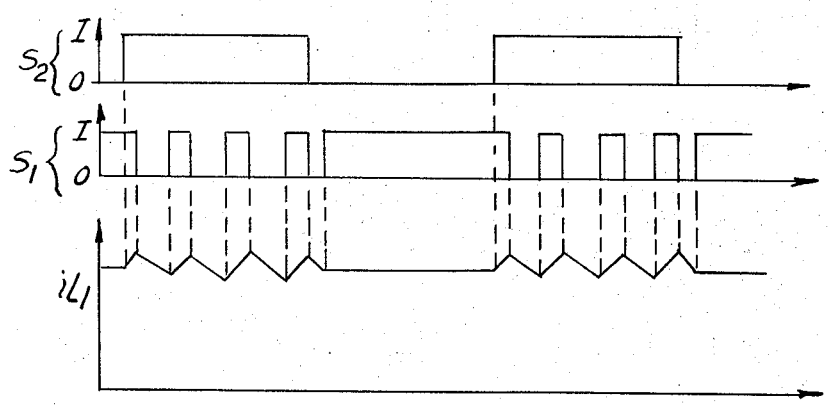
FIG. 3a
FIG. 3b
FIG. 3c

PULSE GENERATOR FOR EDM MACHINE

BACKGROUND OF THE INVENTION

In known pulse generator circuits for electrical discharge machining, EDM, the amplitude of the current pulses is limited by a resistor connected in series with the electrodes (tool and workpiece), a circuit make and break element, or switch, and a DC power supply. In such pulse generator circuits, the overall energetic efficiency is low in view of the fact that a majority of the power supplied by the power supply is dissipated in the resistor. In other types of known pulse generator circuits which permit to achieve a better overall energetic efficiency, an accumulator of electrical energy, for example a self-inductance coil, is provided which, after being charged, discharges into a relaxation circuit comprising the electrodes. The presence of the self-inductance coil in the circuit prevents rapid current variations with the result that the pulses supplied to the machining gap are of a triangular, rather than square, form. A more vertical leading edge of the pulses may be obtained if the accumulator of electrical energy consists of a saturated self-inductance coil which is connected in series with the electrodes and the circuit make and break element such as to cause a rapid variation of the current when the self-inductance coil passes from its saturated state to its non-saturated state and vice-versa, while providing an impedance for limiting the current value when the self-inductance coil is in its non-saturated state. However, the energy stored in the accumulator must be restored to the circuit, and the machining current is maintained from the moment at which the control signal is provided to the circuit make and break element until all of the energy is restored. This functional peculiarity prevents using a circuit of the latter type for providing very high frequency pulses for finish machining, and furthermore the individual duration of each pulse is very difficult to control with precision.

The present invention relates to a circuit permitting to insure that the actual cut-off of the current is effected simultaneously with the command signal for cutting-off the current pulse, permitting to obtain current pulses with a vertical leading edge in a frequency range from the rough machining mode to the finish machining mode, and permitting to control with precision the duration, or period, of each voltage-current pulse. The pulse generator of the invention allows a reduction in the nominal power of the power supply of an order of magnitude of three relative to prior art circuits including a series resistor.

A further advantage of the invention is to provide means for continuously adjusting the amplitude of the current pulses and for permitting, for example, to maintain such amplitude constant even though the voltage of the power supply may vary as a function of voltage fluctuations in the mains. This automatic amplitude regulation of the current pulses further permits to control the amplitude level by a command signal which may be obtained automatically as a function of the physical characteristics of the machining space.

SUMMARY OF THE INVENTION

The principal object, therefore, of the invention is to provide a controlled pulse generator circuit for electrical discharge machining by applying electro-erosive pulses across a machining gap between an electrode tool and an electrode workpiece, such pulse generator comprising a DC power supply, an electromagnetic electrical energy storage element, a first circuit make and break element or switch disposed between one of the terminals of the DC power supply and one of the terminals of the energy storage element, and a first unidirectional element connected between the said terminal of the energy storage element and the other terminal of the DC power supply such as to provide a current path through a first auxiliary circuit when the first circuit make and break element is open, the circuit of the invention being further provided with a second unidirectional element connected between one of the terminals of the DC power supply and one of the electrodes, electrode tool and electrode workpiece, or a second circuit make and break element connected so as to provide a current path through a second auxiliary circuit when the second circuit make and break element is open, or through a third relaxation circuit when both circuit make and break elements are open, the first circuit make and break element being controlled so as to maintain the current flowing through the energy accumulator element at a predetermined value, and the second circuit make and break element being controlled such as to determine the duration of each current or voltage pulse and/or the duration of the time interval between two consecutive voltage pulses.

These and the other objects of the present invention will become apparent to those skilled in the art when the following description of some of the best modes contemplated for practicing the invention is read in conjunction with the accompanying drawings wherein:

BRIEF DESCRIPTION OF THE DRAWINGS

FIG. 1 is a circuit diagram of an example of the present invention;

FIGS. 2a–2c are current curve diagrams helpful in explaining the operation of the circuit according to FIG. 1, while operating in a finish machining mode;

FIGS. 3a–3c are curve diagrams corresponding to those of FIGS. 2a–2c, but illustrating the conditions of operation of the circuit according to FIG. 1 while operating in a fast machining mode, i.e. during rough machining;

DETAILED DESCRIPTION OF THE PREFERRED EMBODIMENTS

Figure 4:
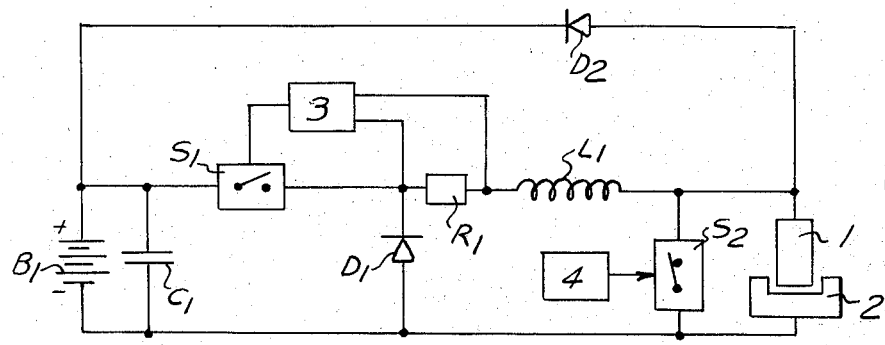
FIGS. 4, 5 and 6 illustrate alternative examples of the present invention.

As shown in FIG. 1, an example of pulse generator circuit according to the present invention comprises a DC power supply $B_1$ for supplying the current causing electrical discharges to take place between an electrode tool 1 and an electrode workpiece 2. The positive terminal of the power supply $B_1$ is connected to the electrode tool 1 by a circuit branch comprising in series an auxiliary power supply $B_2$, a circuit make and break element or switch $S_1$, for example in the form of a transistor switch, a resistor $R_1$ and a self-inductance coil $L_1$, the latter defining an electromagnetic storage or accumulator element. This branch of the circuit is shunted by a diode $D_2$, connecting the terminal of the self-inductance coil $L_1$ connected to the electrode tool 1 directly to the positive terminal of the power supply $B_1$.

Resistor $R_1$ has a very low resistance value and simply permits to sense the current flowing from the power supply $B_1$ to the self-inductance coil $L_1$. The passage of current through the resistor $R_1$ causes a voltage drop which provides a signal applied to the input of a control element 3 for operating the circuit make and break element, or switch, $S_1$ by opening and closing the make and break element at a predetermined average rate. In view of the very low resistance value selected for the resistor $R_1$, the presence of resistor $R_1$ in the circuit does not cause per se a significant reduction in the current flowing between the electrode tool 1 and the workpiece 2. Consequently, the resistor $R_1$ does not behave as a discharge current limiting element as in the prior art circuits mentioned hereinbefore.

The negative terminal of the power supply $B_1$ is connected to the workpiece 2 through a circuit make and break element, or switch, $S_2$ controlled by a pulse generator 4. A diode $D_1$ connects the negative terminal of the power supply $B_1$ to the junction 5 between the circuit make and break element $S_1$ and the resistor $R_1$. A capacitor $C_1$ is connected as a shunt across the power supply $B_1$ for providing a path for high frequency pulses.

The auxiliary power supply $B_2$ may be omitted. However, by providing such an auxiliary power supply, electrical energy may be stored in the self-inductance coil $L_1$ during the period of time when the electrode tool is separated from the electrode workpiece by too wide a gap for permitting electrical discharge to take place across the gap. The voltage of the auxiliary power supply $B_2$ may be of the order of 4 volts, for example, while the main power supply $B_1$ has a voltage of the order of 80 volts.

The operation of the circuit of FIG. 1 is explained hereinafter with respect to two different modes of operation, the first one corresponding to finish machining and the second corresponding to rough machining of the workpiece.

During operation of the EDM machine in a finish machining mode, the machining current is relatively small and the pulse frequency is relatively high. The pulse frequency is determined by appropriate initial setting of the pulse generator 4 for operation at a given frequency. The frequency setting of the pulse generator 4 in turn controls the frequency of operation of the circuit make and break element $S_2$. The machining pulses are represented at FIG. 2a wherein the conductive state of the circuit make and break element $S_2$ is arbitrarily represented by a current value I, while the non-conductive state of the circuit make and break element is represented by a zero value. The conductive state I and the non-conductive state 0 of the circuit make and break element $S_1$, controlled by the control means 3 which measures the current flowing through the resistor $R_1$, are shown at FIG. 2b. When the current flowing through the resistor $R_1$ is higher than a reference value, the circuit make and break element $S_1$ is turned off, and when the current flowing through the resistor $R_1$ is less than a second reference value lower than the first reference value, the circuit make and break element $S_1$ is closed. Consequently, the closure and opening periods of the circuit make and break element $S_1$ vary proportionally to the average current obtained as a function of the setting of the reference values.

Prior to the start of machining, the electrode tool 1 is away from the electrode workpiece 2 such that the wide gap spacing between the two electrodes prevents the passage of current through the gap and no current is supplied by the power supply $B_1$. However, the auxiliary power supply $B_2$ provides a current flow across the inductance coil $L_1$, such current flow increasing until it reaches a predetermined value that triggers the control means 3. When this happens, the control means 3 operates the circuit make and break element $S_1$ so as to remove the auxiliary power supply $B_2$ from the circuit. The current flow across the inductance coil $L_1$ decreases while the inductance coil $L_1$ discharges through the diode $D_2$, the power supply $B_1$, the diode $D_1$ and the resistor $R_1$. As soon as the decreasing current flow reaches a second reference value, less than the first reference value, the control means 3 is again triggered to close, this time, the circuit make and break element $S_1$, and the power supply $B_2$ again supplies electrical energy into the electromagnetic accumulator defined by the inductance coil $L_1$ so as to increase the current flow through the inductance coil until it reaches its first reference value.

As soon as the electrode tool 1 is close enough to the electrode workpiece 2 such that the voltage amplitude thereacross is higher than the dielectric piercing voltage, an electrical discharge occurs through the machining gap each time the circuit make and break element $S_2$ is closed. While machining, each time both the circuit make and break elements $S_1$ and $S_2$ are closed simultaneously, the machining current is supplied from the power supply $B_1$ through the power supply $B_2$, the circuit make and break element $S_1$ and the inductance coil $L_1$, such that the inductance coil stores a certain amount of electrical energy. During the intervals of time when the circuit make and break element $S_2$ is open, while the circuit make and break element $S_1$ is closed, the power supply $B_1$ is not connected in the circuit and the current circulating through the inductance coil $L_1$ increases slowly, such current flowing through the diode $D_2$, the auxiliary power supply $B_2$, the circuit make and break element $S_1$ and the resistor $R_1$.

When the circuit make and break element $S_1$ is open, while the circuit make and break element $S_2$ is closed, the power supply $B_1$ does not supply any current, and the current across the inductance coil $L_1$ decreases, such current flowing through the machining gap, the circuit make and break element $S_2$, the diode $D_1$ and the resistor $R_1$. Consequently, in such operating mode, part of the electrical energy stored in the inductance coil $L_1$ is supplied to the machining gap.

When both circuit make and break elements $S_1$ and $S_2$ are open, the current through the inductance coil $L_1$ is caused to decrease, such current flowing through the diode $D_2$, the power supply $B_1$, the diode $D_1$ and the resistor $R_1$. Under such condition, part of the electrical energy stored in the inductance coil $L_1$ is restored to the power supply $B_1$.

FIG. 2c is a diagram illustrating the current variation $iL_1$ through the inductance coil $L_1$ as a function of time and as a function of the opening and closing periods of the circuit make and break elements $S_1$ and $S_2$, the operation of the make and break elements $S_1$ and $S_2$ being illustrated at FIGS. 2b and 2a respectively. It can be seen that during the periods of time when the circuit make and break element $S_1$ is closed the current flowing through the inductance coil $L_1$ increases substantially each time the circuit make and break element $S_2$ is closed, while the current remains substantially constant during the periods of time when the current make and break element $S_2$ is closed. During the periods of time when the circuit make and break element $S_1$ is open, the current through the inductance coil $L_1$ decreases anyway, but such decrease is at a higher rate during the periods of time when the current is caused to flow through the power supply $B_1$, because the voltage of the power supply $B_1$ is higher than the electrical discharge voltage across the electrode tool 1 and the electrode workpiece 2.

FIGS. 3a, 3b and 3c correspond respectively to FIGS. 2a, 2b and 2c, but represent the machining conditions for rough machining, that is conditions for which the periods of time during which the circuit make and break element $S_2$ is closed are of relatively long duration. During each of those periods, the circuit make and break element $S_1$ is open and closed several times in order to maintain the machining current between the two predetermined reference values. To each period of closure of the circuit make and break element $S_1$ corresponds an increase of the current flowing through the inductance coil $L_1$ while a decrease of the current flowing through the inductance coil $L_1$ corresponds to each period of opening of the circuit make and break element $S_1$, as the current is caused to flow through the diode $D_1$. As soon as the circuit make and break element $S_1$ opens, the current flowing through the inductance coil $L_1$ continues to flow through the machining gap, the circuit make and break element $S_2$ and the diode $D_1$. When the circuit make and break element $S_2$ opens, the current flowing through the inductance coil $L_1$ decreases, such current flowing through the diode $D_2$, the power supply $B_1$ and the diode $D_1$. However, as soon as the current flow falls below one of the predetermined reference values, the circuit make and break element $S_1$ closes and the current flowing through the inductance coil $L_1$ flows through the diode $D_2$, the power supply $B_2$ and the circuit make and break element $S_1$.

Briefly stated therefore, the pulse generator circuit illustrated at FIG. 1 comprises a main circuit defined by the circuit make and break element $S_1$, the inductance coil $L_1$, the machining gap between the electrode tool 1 and the electrode workpiece 2, and the circuit make and break element $S_2$, combined with three auxiliary circuits defined by shunts permitting current to continue to flow through the inductance coil $L_1$ whenever one or the other, or both, of the circuit make and break elements $S_1$ and $S_2$ are open. The current flow through the main circuit is arbitrarily represented by full arrows at FIG. 1, while the current flow through each of the three auxiliary circuits is arbitrarily represented by dash line, dotted line, and dot and dash line arrows, respectively.

The only difference between the circuit of FIG. 4 and that of FIG. 1 is that in the circuit of FIG. 4 the auxiliary power supply $B_2$ is omitted and the circuit make and break element $S_2$ is connected in parallel with the machining gap instead of being in series with the gap.

In the circuit of FIG. 4, the electrical discharge current is supplied to the machining gap by the power supply $B_1$ when the circuit make and break element $S_1$ is closed and the circuit make and break element $S_2$ is open. When the two circuit make and break elements $S_1$ and $S_2$ are closed, the power supply $B_1$ continues to supply the inductance coil $L_1$ in current by means of a main circuit comprising the circuit make and break element $S_1$, the resistor $R_1$ and the circuit make and break element $S_2$.

When the circuit make and break element $S_1$ is open, current still flows through the inductance coil $L_1$, but at a progressively decreasing rate, such current flowing either across the machining gap, the diode $D_1$ and the resistor $R_1$ as long as the circuit make and break element $S_2$ is open, or through the circuit make and break element $S_2$ when the circuit make and break element $S_2$ is closed, and through the diode $D_1$ and the resistor $R_1$. In th latter case, the decrease in current flow is very small because the circuit has a very low impedance.

In the example of circuit illustrated at FIG. 4, diode $D_2$ is necessary to prevent an over-voltage when the electrode tool 1 is retracted from its close proximity to the electrode workpiece 2 simultaneously with the circuit make and break element $S_2$ being still open. Under those conditions, the current flowing through the inductance coil $L_1$ is still able to flow through the diode $D_2$ and the circuit make and break element $S_1$ if the latter is closed, and in the event that the circuit make and break element $S_1$ is open, the current flows through the diode $D_2$, the power supply $B_1$ and the diode $D_1$.

Figure 5:
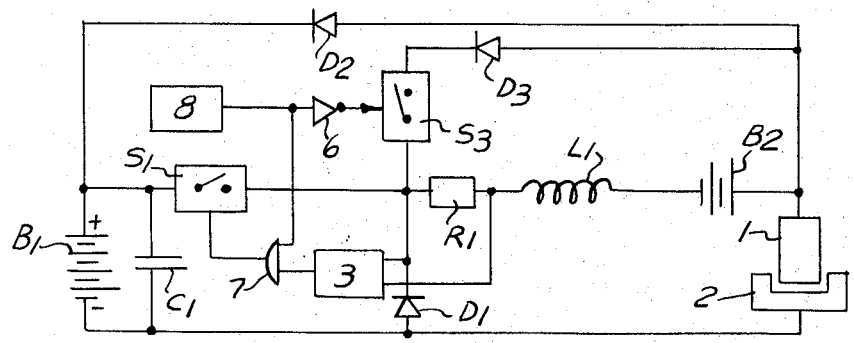

The circuit illustrated at FIG. 5 also comprises a main circuit defined by the circuit make and break element $S_1$, the resistor $R_1$, the self-inductance coil $L_1$ and the machining zone between the electrode tool 1 and the electrode workpiece 2. A similar diode $D_2$, as in FIGS. 1 and 4, connects the electrode tool 1 to the positive terminal of the power supply $B_1$, and the diode $D_1$ is connected in parallel to the circuit consisting of the resistor $R_1$, the coil $L_1$ and the machining gap.

In the embodiment of FIG. 5, the control of the machining pulse across the gap is obtained by a circuit make and break element, or switch, $S_3$ shunting the self-inductance coil $L_1$ and connected in series with a diode $D_3$. An auxiliary source of current $B_2$ is disposed between the coil $L_1$ and the electrode tool 1.

When the electrode tool 1 is far away from the electrode workpiece 2 and the two circuit make and break elements $S_1$ and $S_3$ are closed, the power supply $B_2$ supplies a current flowing through the inductance coil $L_1$. This current flows through two parallel circuit branches, one branch being defined by the diode $D_3$ and the circuit make and break element $S_3$, and the other branch being defined by the diode $D_2$ and the circuit make and break element $S_1$. When one or the other of the circuit make and break elements $S_3$ or $S_1$ is open, the current from the power supply $B_2$ can obviously flow only through one of the two branches. When the two circuit make and break elements are open simultaneously, the current flowing through the inductance coil $L_1$ decreases, such current flowing through the diode $D_2$, the power supply $B_1$ and the diode $D_1$.

As soon as the distance between the electrode tool 1 and the electrode workpiece 2 becomes short enough to enable machining, when the circuit make and break element $S_1$ closes, the power supply $B_1$ supplies machining current through the inductance coil $L_1$ and the power supply $B_2$, irrespective of the state of the circuit make and break element $S_3$ which is placed out of the circuit by reverse direction connection of the diode $D_3$. The voltage of the power supply $B_1$ is much higher than the voltage of the power supply $B_2$ and therefore the voltage of the power supply $B_1$, decreased by the voltage of the power supply $B_2$, appears across the inductance coil $L_1$, such that the circuit make and break element $S_3$ is placed at a positive voltage relative to that of the anode of the diode $D_3$. The circuit make and break element $S_3$ and the diode $D_3$ could be replaced by a thyristor.

The simultaneous closure of the circuit make and break elements $S_1$ and $S_3$ cannot occur in the circuit of FIG. 5, because such simultaneous closure is avoided by means of an inverter 6 and an AND gate 7 which cause the circuit make and break element $S_1$ to be open, i.e., to be non-conductive, each time the circuit make and break element $S_3$ is closed, i.e., is conductive.

When the circuit make and break elements $S_1$ and $S_3$ are open simultaneously, the current flowing through the inductance coil $L_1$ flows through the machining gap by flowing through the series circuit consisting of the power supply $B_2$, the diode $D_1$ and the resistor $R_1$. The end of each machining pulse is achieved as a result of closing the circuit make and break element $S_3$ which, as previously explained, is accomplished simultaneously with the opening of the circuit make and break element $S_1$. When this occurs, the current flowing through the inductance coil $L_1$ flows through the power supply $B_2$, the diode $D_3$, the circuit make an break element $S_3$ and the resistor $R_1$.

Figure 6:
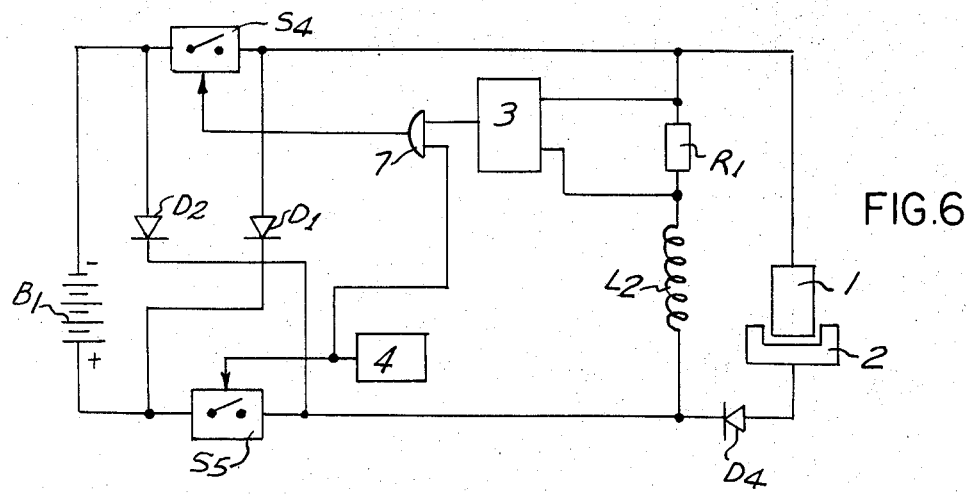

In the circuit illustrated at FIG. 6, the power supply $B_1$ is capable of being connected to the machining gap through a pair of circuit make and break elements $S_4$ and $S_5$ connected in series, respectively, with each of the terminals of the power supply. A pair of diodes $D_1$ and $D_2$ are disposed so as to connect respectively the negative terminal of the power supply $B_1$ and the electrode tool 1 with one or the other of the terminals of the circuit make and break element $S_5$.

In the circuit of FIG. 6, the electromagnetic energy accumulator is provided by a self-inductance coil $L_2$ connected in parallel across the machining gap, a diode $D_4$ being connected in series in the circuit. As in the circuits hereinbefore described, the detection of the current flowing through the inductance coil $L_2$ is effected as a result of a voltage appearing across a resistor $R_1$ of very low resistance value, connected in series with the inductance coil $L_2$. In a manner similar to that of the precedingly described circuits, a current sensor 3 controls the circuit make and break element $S_4$ through an AND gate 7, an input of which is connected to the pulse generator 4. In this manner, the operation of the circuit make and break element $S_4$ is forced to follow the control signals provided to the circuit make and break element $S_5$, i.e., is forced to follow the control pulses.

In the arrangement of FIG. 6, when the electrode tool 1 is too far away from the workpiece 2 to allow electrical discharge machining to take place across the gap, the circuit make and break element $S_4$ is closed simultaneously with the circuit make and break element $S_5$ until a nominal current is established through the inductance coil $L_2$. During the periods of time when the circuit make and break elements $S_4$ and $S_5$ are both open simultaneously, the current flowing through the inductance coil $L_2$ progressively decreases while still flowing through the diode $D_2$, the power supply $B_1$ and the diode $D_1$. As soon as the nominal current is reached, the circuit make and break element $S_4$ is turned off and the power supply $B_1$ is no longer connected to the inductance coil $L_2$.

As soon as the electrode tool-electrode workpiece gap is narrow enough to permit electrical discharges to take place across the gap, the current flowing through the inductance coil $L_2$ passes across the machining gap each time the circuit make and break elements $S_4$ and $S_5$ are simultaneously open. If the circuit make and break element $S_5$ is the only one which is closed, the current flow through the inductance coil $L_2$ is maintained through the diode $D_1$ and the circuit make and break element $S_5$. When both circuit make and break elements $S_4$ and $S_5$ are closed, the current flow through the inductance coil $L_2$ increases in view of the fact that the coil is directly connected across the power supply $B_1$.

Figure 7:
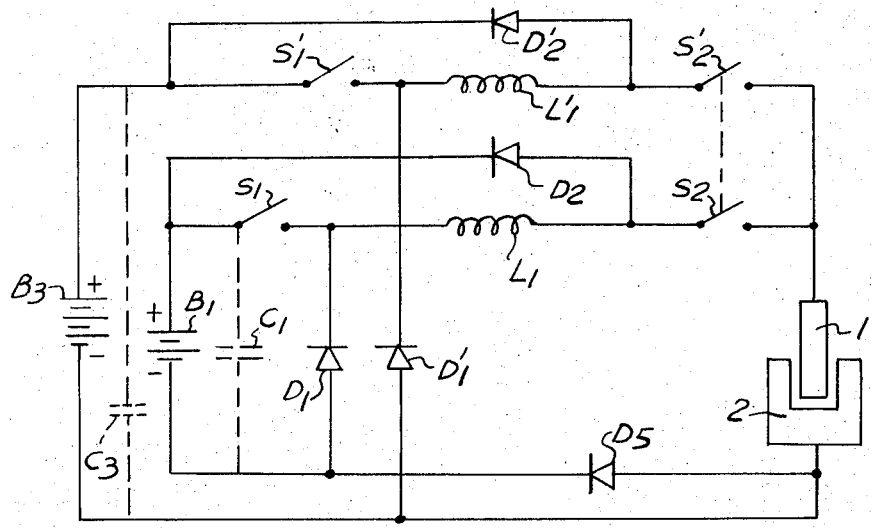
FIG. 7 illustrates a modification of the circuit of FIG. 1.

FIG. 7 illustrates a circuit of the same general configuration of that of FIG. 1, but utilizing two electrical power supplies. The power supplies, designated respectively at $B_1$ and $B_3$ and preferably respectively shunted by capacitors $C_1$ and $C_3$, are of different voltage and may be, through the circuit make and break elements $S_2$ or $S'_2$, placed into the circuit individually or together. In this manner, it is possible to apply a high voltage across the machining zone by means of the power supply $B_3$ and a machining current by means of the power supply $B_1$, as is known in the art.

The circuit of FIG. 7 consists, for all practical purposes, of two similar circuits each according to the circuit of FIG. 1, each of the circuits including one of the power supplies. Each circuit includes a pair of circuit make and break elements, one circuit being provided with a circuit make and break element pair $S_1$ and $S_2$ and the other being provided with a circuit make and break element pair $S'_1$ and $S'_2$. The circuit make and break elements $S_1$ and $S_2$ are connected in the circuit on one side or the other of an inductance coil $L_1$ and the circuit make and break elements $S'_1$ and $S'_2$ are connected on one side or the other of a second inductance coil $L'_1$. A blocking diode $D_5$ is connected in the circuit as shown for preventing current flow from the high voltage power supply $B_3$ to be established through the low voltage power supply $B_1$ when both circuit make and break elements are closed and current flow across the machining gap is not yet established in view of too wide a gap spacing between the electrode tool 1 and the electrode workpiece 2. As a result of using two separate power supplies $B_1$ and $B_3$ and of providing separate independent controls for the circuit breakers $S_2$ and $S'_2$, current pulses of different voltages may be established, as is well known in the art, or, alternatively, separate power supplies may be provided for at least two electrode tools.

The circuit of FIG. 7 may be modified by replacing the separate power supplies $B_1$ and $B_3$ by a single power supply for both inductance coils $L_1$ and $L'_1$. The two circuit make and break elements $S_2$ and $S'_2$ must then be synchronized, as is arbitrarily shown by their connecting dash line at FIG. 7. The circuit can also be modified by providing as many parallel circuits, and consequently as many self-inductance coils, as there are transistors connected in parallel in the circuit make and break elements $S_1$ and $S_2$. Such an arrangement presents the advantage of balancing the currents flowing through each of the transistors.

Figure 8:
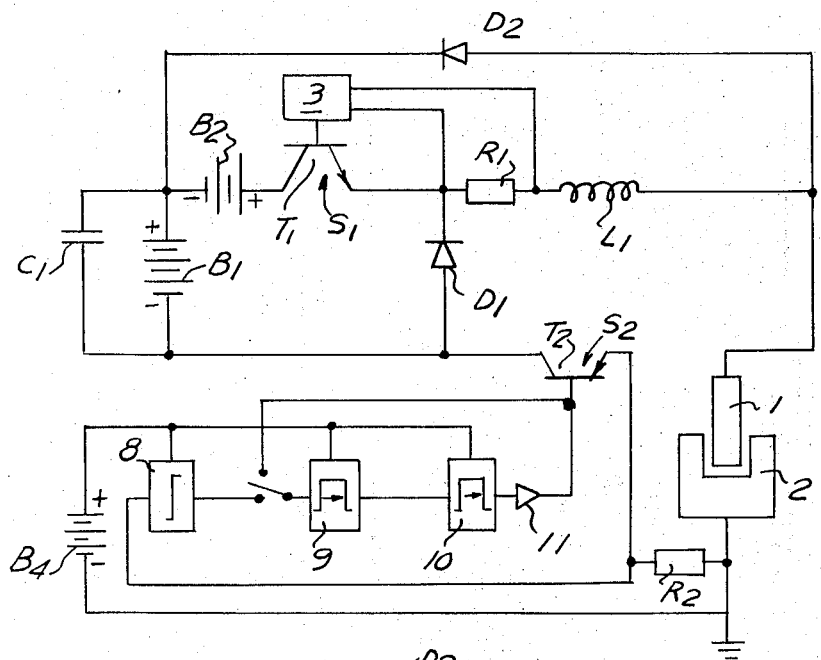
FIG. 8 illustrates a circuit similar to FIG. 1 but modified for use in an EDM machine in which the pulse generator is controlled by the actual occurrence of each electrical discharge across the machining gap.

The circuit of FIG. 8 illustrates a modification of the circuit of FIG. 1 for use in an EDM machine in which the pulse generator is controlled by the actual occurrence of the current discharge pulses across the gap. In a circuit of this type, which is known in the art, the establishment of electrical discharges across the gap causes current to flow through a resistor $R_2$ connected to the electrode workpiece 2, and the voltage appearing across the resistor $R_2$ is applied to a trigger 8 for providing a sharpe pulse in coincidence with each discharge across the gap. The sharp pulse from the trigger 8 is applied to the input of a monostable multivibrator 9 which determines the period of the pulse. The monostable multivibrator 9 is followed by a monostable multivibrator 10 which determines the time duration between the end of a pulse and the beginning of a voltage pulse being established across the machining gap to provide the next consecutive machining pulse. The multivibrator 10 controls, through an inverter 11, a transistor $T_2$ which constitutes the circuit make and break element $S_2$ according to the arrangement of FIG. 1. The power supply $B_4$ provides appropriate voltage for the operation of the trigger 8 and of the multivibrators 9 and 10. The remaining of the circuit is identical to that of FIG. 1, the circuit make and break element $S_1$ consisting of a transistor $T_1$ whose base bias is controlled by the control device 3 to open or close the emitter-collector circuit of the transistor.

It will be obvious to those skilled in the art that many variations of the described circuits may be conceived within the scope of the present invention. For example, the auxiliary power supply $B_2$ of FIG. 1 may be omitted. In this manner by omitting the auxiliary power supply $B_2$ in the circuit of FIG. 1, electrical energy cannot be stored in the inductance coil $L_1$ prior to the electrode tool 1 being positioned close enough to the electrode workpiece 2 to permit electrical discharge machining. Machining will start, under those conditions, by way of a train of pulses having a current flow increasing progressively until the nominal current flow is reached.

The circuit of FIG. 1 can also be modified by connecting the auxiliary power supply $B_2$ to a further auxiliary circuit disposed in series with the coil $L_1$ or in series with the diode $D_2$.

Figure 9:
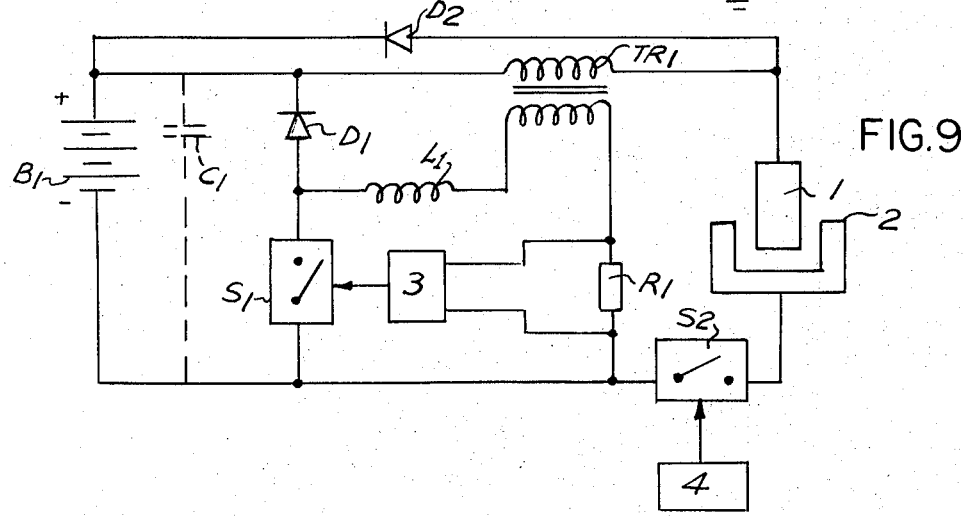
FIG. 9 illustrates a further modification of the circuit of FIG. 1.

A further modification of the circuit of FIG. 1 is shown at FIG. 9 wherein the inductance coil $L_1$ is electromagnetically coupled to the circuit by means of a current transformer $TR_1$. In such an embodiment, the circuit including the secondary of the transformer $TR_1$ includes the circuit make and break element $S_1$ in series therewith, such that when both circuit make and break elements $S_1$ and $S_2$ are open, the current flowing through the inductance coil $L_1$ flows through the power supply $B_1$ in a direction opposite to the current supplied by the power supply. The primary winding of the transformer $TR_1$ is connected in parallel with the unidirectional element $D_2$ between one of the terminals of the power supply $B_1$ and the electrode tool 1. The operation of such a circuit is similar to that of the precedingly described circuits. The use of a transformer $TR_1$ presents the advantage of tailoring the useful voltage and current through the inductance coil and the primary of the transformer in function of the turn ratio of the transformer.

It will be appreciated that some of the circuits illustrated show the electrode tool being connected such as to be cathodic in the course of an electrical discharge, while the electrode workpiece is anodic, and other circuits show the opposite. As is well known in the art, the relative polarity of the electrodes in an EDM operation depends upon the materials of the electrode tool and electrode workpiece, and EDM power supplies are generally provided with a reverse polarity control.

Having thus described the invention by way of typical examples thereof, what is sought to be protected by United States Letters Patent is as follows:

1. In an electrical discharge machining apparatus for electro-erosion of material from an electrode workpiece by means of consecutive intermittent pulses being applied across a machining gap between said electrode workpiece and an electrode tool, a pulse generator comprising a DC power supply having a first and a second terminal, an electromagnetic energy accumulator, a first make and break element connected between the first of the terminals of said power supply and a first terminal of said accumulator, a first unidirectional element connected between the second terminal of said power supply and the first terminal of said accumulator, a second unidirectional element connected between the second terminal of said accumulator and the first terminal of said power supply, and a second make and break element connected such as to provide a current path in a main circuit when at least said first make and break element is closed, in a first auxiliary circuit when at least said first make and break element is open, in a second auxiliary circuit when at least said second make and break element is open, and in a third auxiliary circuit when both said make and break elements are open, means for controlling said first make and break element for maintaining the current flowing through said accumulator at a predetermined value, and means for controlling said second make and break element at a predetermined frequency for controlling the period of each current-voltage pulse across the machining gap.

2. The pulse generator of claim 1 wherein said main circuit comprises at least said power supply, said first make and break element and said accumulator, the first of said auxiliary circuits comprises said accumulator and said first unidirectional element, the second of said auxiliary circuits comprises said accumulator, and the third of said auxiliary circuits comprises said accumulator, said second unidirectional element, said power supply and said first unidirectional element.

3. The pulse generator of claim 2 wherein said main circuit further comprises said machining gap and said second make and break element, the first of said auxiliary circuits further comprises said machining gap and said second make and break element, and the second of said auxiliary circuits further comprises said first make and break element.

4. The pulse generator of claim 1 wherein said electromagnetic energy accumulator is a self-inductance coil, and the make and break elements consist each of at least the transistor and each unidirectional element consists of at least one diode.

5. The pulse generator circuit of claim 2 wherein the second make and break element is connected in series with said electrodes in the first of said auxiliary circuits.

6. The pulse generator circuit of claim 2 wherein the second make and break element is connected in parallel with said electrodes whereby when said second make and break element is closed during the time interval between two consecutive pulses and the first make and break element is open current flows through a fourth auxiliary circuit comprising said accumulator and said first unidirectional element.

7. The pulse generator of claim 6 wherein said main circuit further comprises said machining gap, the first of said auxiliary circuits further comprises said machining gap, and the second of said auxiliary circuits further comprises said first make and break element.

8. The pulse generator circuit of claim 2 wherein the second make and break element is connected in series with a third unidirectional element providing a current path when the first make and break element is open and the second make and break element is closed during a time interval between two consecutive pulses through a fourth auxiliary circuit comprising said accumulator and said third unidirectional element.

9. The pulse generator of claim 8 wherein said main circuit further comprises said machining gap, the first of said auxiliary circuits further comprises said machining gap, and the second of said auxiliary circuits further comprises said first make and break element.

10. The pulse generator circuit of claim 2 wherein each of the terminals of the power supply is connected to a corresponding terminal of the accumulator by means of a make and break element, and a third unidirectional element is connected in series with said electrodes for providing a current path when both said make and break elements are open during a current pulse through a an auxiliary circuit comprising said accumulator and said third unidirectional element and said electrodes.

11. The pulse generator of claim 10 wherein said main circuit further comprises said second make and break element, the first of said auxiliary circuits further comprises said first make and break element and the second of said auxiliary circuits further comprises said second make and break element.

12. The pulse generator of claim 1 comprising at least two electrical energy accumulators each having a terminal connected to a terminal of at least one power supply through said first make and break element, the other of the terminals of each of said accumulators being connected to one of said electrodes through said second make and break element, at least a pair of unidirectional elements each connected between said other terminal of each accumulator and the other terminal of said power supply such as to provide a current path in said first auxiliary circuit when the first of said make and break elements is open, and at least two additional unidirectional elements each connected between said first terminal of said power supply and the other terminal of said accumulator such as to provide a current path through said second auxiliary circuit when the first make and break element is closed and the second is open, and through said third auxiliary circuit when both first and second make and break elements are open.

13. The pulse generator of claim 1 wherein at least one of the auxiliary circuits comprises an auxiliary DC power supply connected in series with said accumulator.

14. The pulse generator of claim 1 wherein said means for controlling said first make and break element opens said make and break element when the value of the current circulating through said accumulator reaches a first predetermined level and closes said make and break element when the value of said current reaches a second predetermined level, said second level being less than said first level.

15. The pulse generator circuit of claim 1 wherein said means for controlling said first make and break element opens said element for a predetermined time interval when the current flowing through said accumulator reaches a predetermined level.

16. The pulse generator circuit of claim 1 wherein said means for controlling said first make and break element opens said element for a predetermined time interval when the current flowing through the first make and break element reaches a predetermined level.

17. The pulse generator circuit of claim 1 wherein said means for controlling said first make and break element opens said element for a predetermined time interval when the current flowing through the machining gap reaches a predetermined level.

18. The pulse generator circuit of claim 1 wherein said means for controlling said first make and break element opens and closes said element as a function of the difference between the average current value flowing through said accumulator and a predetermined reference value.

19. The pulse generator circuit of claim 1 wherein said means for controlling said first and make break element controls the period of time during which said make and break element is open such as to decrease said period of time as a function of the voltage across said accumulator.

20. The pulse generator circuit of claim 15 wherein said means for controlling said first make and break element controls the period of time during which said make and break element is open such as to decrease said period of time as a function of the voltage across said accumulator.

21. The pulse generator circuit of claim 16 wherein said means for controlling said first make and break element controls the period of time during which said make and break element is open such as to decrease said period of time as a function of the voltage across said accumulator.

22. The pulse generator circuit of claim 17 wherein said means for controlling said first make and break element controls the period of time during which said make and break element is open such as to decrease said period of time as a function of the voltage across said accumulator.

23. The pulse generator circuit of claim 1 wherein means are provided for synchronizing the operation of the make and break elements such that the opening or closing of one of said elements correspond to the closing of the other of said elements.

24. The pulse generator circuit of claim 1 wherein the accumulator is a self-inductance coil having an inductance decreasing as a function of the current flow therethrough.

* * * * *

UNITED STATES PATENT OFFICE
CERTIFICATE OF CORRECTION

Patent No. 3,832,510                    Dated  August 27, 1974

Inventor(s)  Jean Pfau et al

It is certified that error appears in the above-identified patent and that said Letters Patent are hereby corrected as shown below:

IN THE SPECIFICATIONS

Column 2, line 20, change "relaxation" to --auxiliary--.

Column 6, line 19, after the word "In" change "th" to --the--.

IN THE CLAIMS

Claim 4, Column 10, line 62, change "the" to --one--.

Claim 10, Column 11, line 34, delete the word "a" before the word "an".

Signed and sealed this 19th day of November 1974.

(SEAL)
Attest:

McCOY M. GIBSON JR.
Attesting Officer

C. MARSHALL DANN
Commissioner of Patents